T. R. LULHAM.
BOOT PROTECTOR.
APPLICATION FILED OCT. 23, 1919.

1,379,458.

Patented May 24, 1921.
8 SHEETS—SHEET 1.

Witnesses:

Inventor
Thomas R. Lulham

T. R. LULHAM.
BOOT PROTECTOR.
APPLICATION FILED OCT. 23, 1919.
1,379,458.
Patented May 24, 1921.
8 SHEETS—SHEET 2.
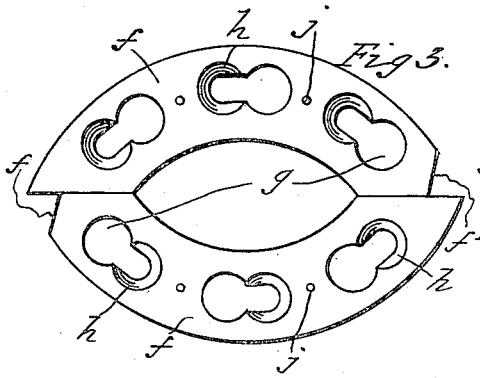
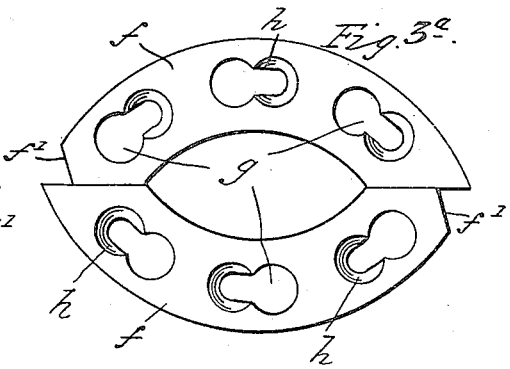
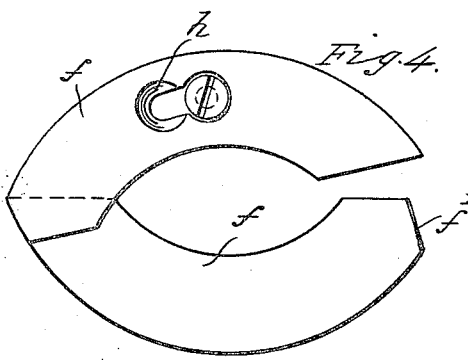
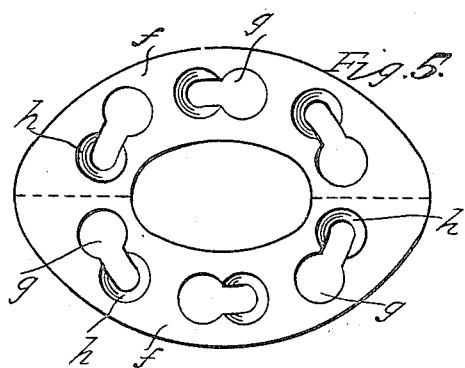
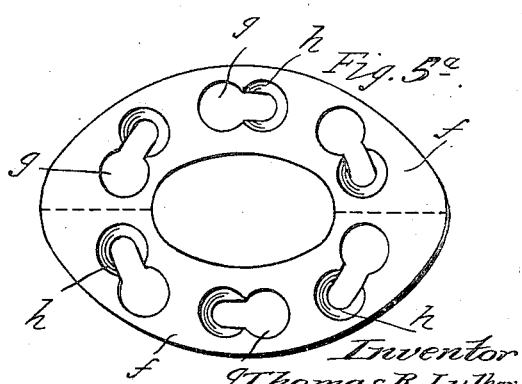

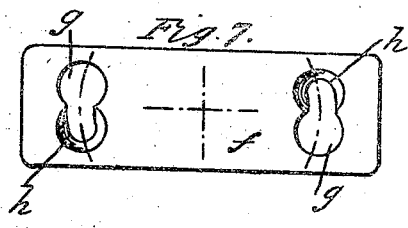
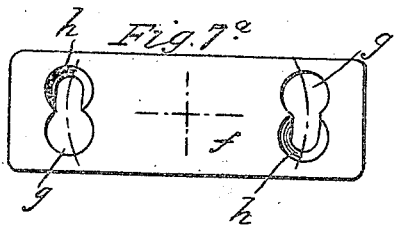
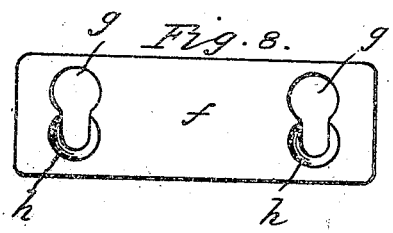
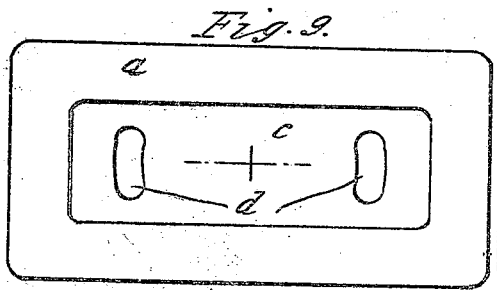
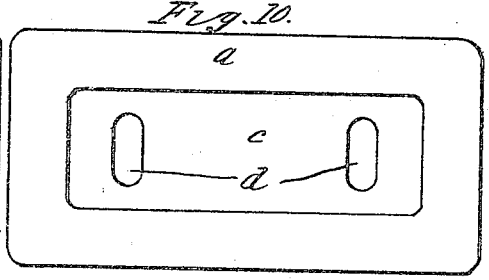

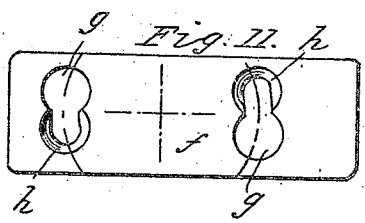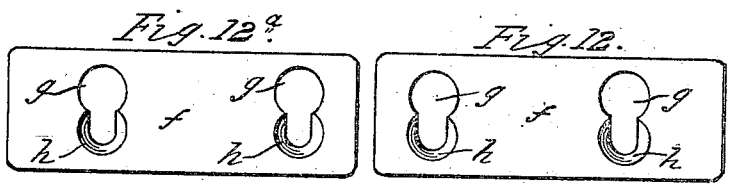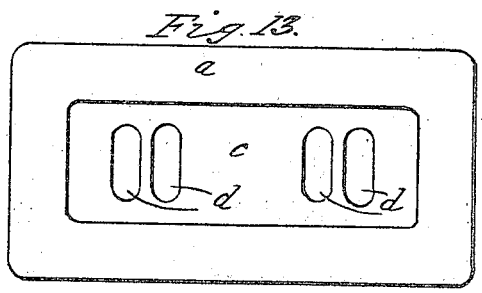

T. R. LULHAM.
BOOT PROTECTOR.
APPLICATION FILED OCT. 23, 1919.
1,379,458.
Patented May 24, 1921.
8 SHEETS—SHEET 5.
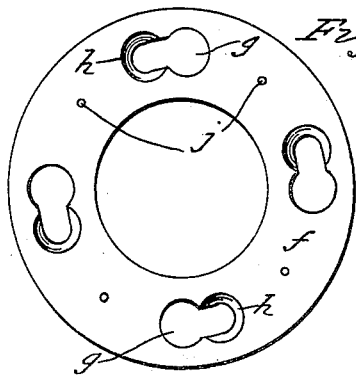
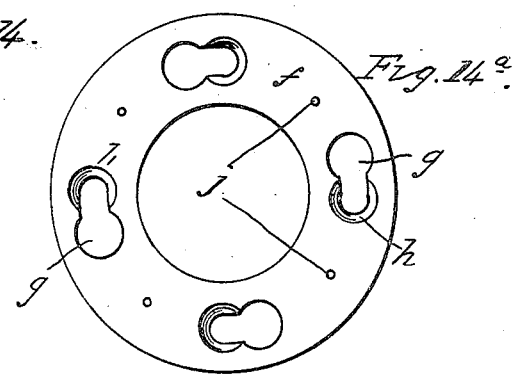
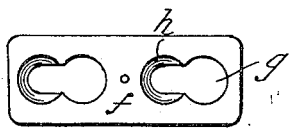
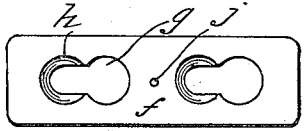
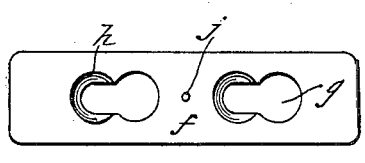
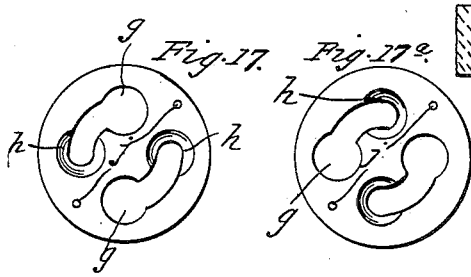
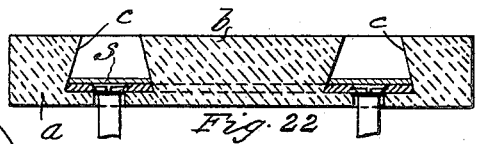
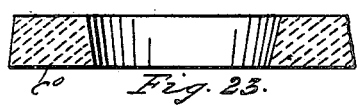
Witnesses:
Inventors
Thomas R. Lulham
by
Attorney T. R. LULHAM.
BOOT PROTECTOR.
APPLICATION FILED OCT. 23, 1919.
1,379,458
Patented May 21, 1921
8 SHEETS—SHEET 6.
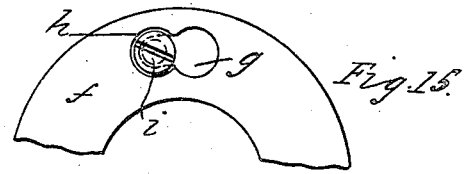
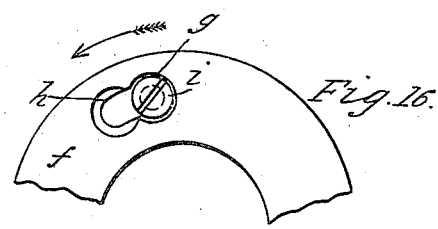
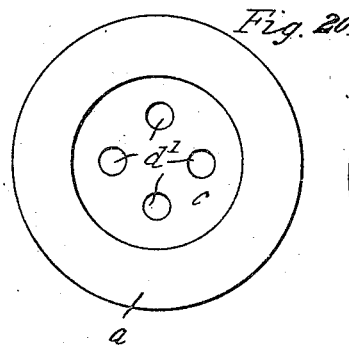
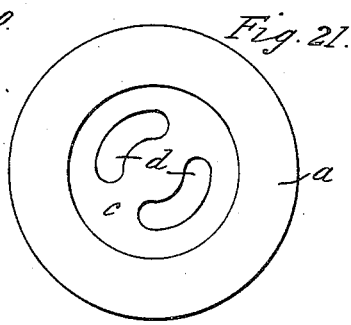
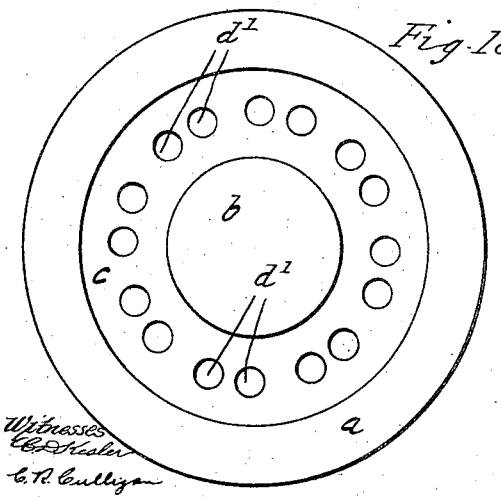
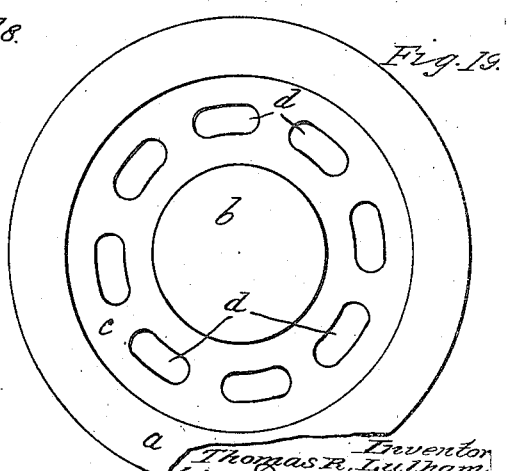

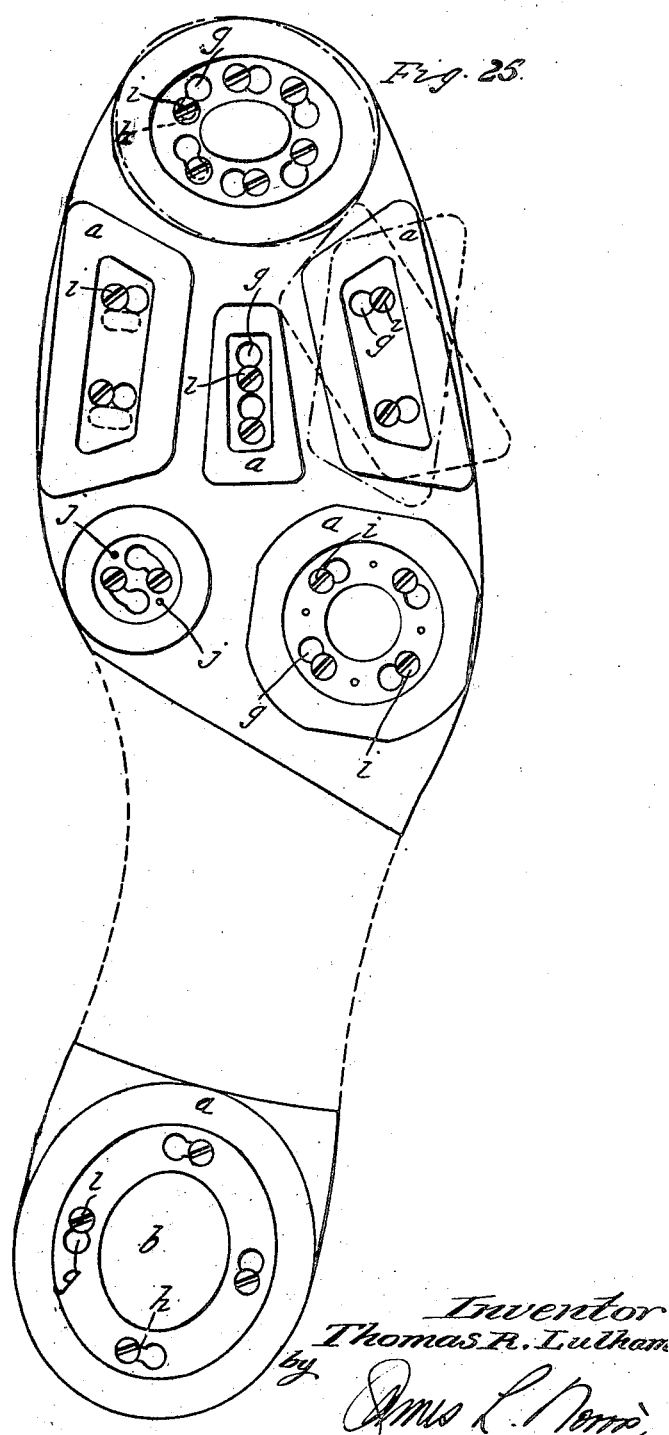

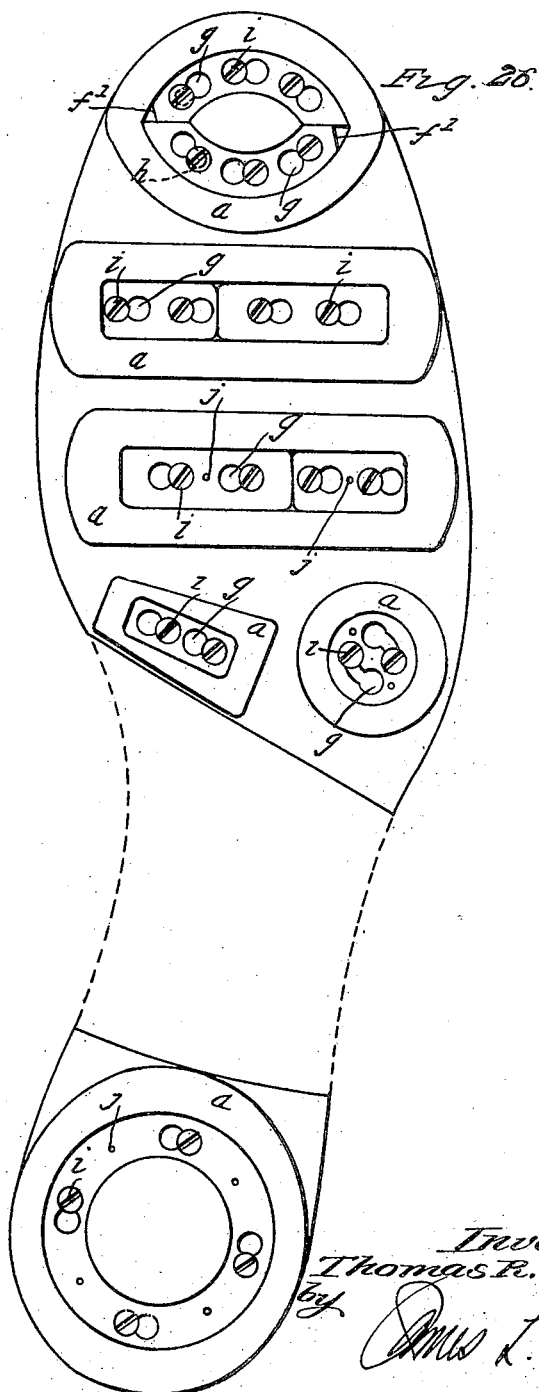

UNITED STATES PATENT OFFICE.

THOMAS RICHARD LULHAM, OF JOHANNESBURG, SOUTH AFRICA.

BOOT-PROTECTOR.

1,379,458.  Specification of Letters Patent.  Patented May 24, 1921.

Application filed October 23, 1919. Serial No. 332,808.

*To all whom it may concern:*

Be it known that I, THOMAS RICHARD LULHAM, a subject of the King of Great Britain, residing in Johannesburg, South Africa, but at present residing in London, England, have invented certain new and useful Improvements in Boot-Protectors, of which the following is a specification.

This invention relates to protectors for the soles and heels of boots or shoes and their means of attachment, and it has for one of its main objects to save material, time and labor by judiciously subdividing the protected area and making the several parts of the protecting elements or of some of them interchangeable with others on the same boot or on its fellow and providing means of attachment whereby the reversal of position or interchange of protectors, or the substitution of new protecting elements, can be rapidly accomplished without special tools.

Various attempts have been made to secure the objects contemplated in the present invention and many of them have proved of little use in practice from lack of appreciation of the fact that one cannot repeatedly unscrew and re-screw a threaded stud or screw in leather without so enlarging the hole or destroying the thread formed in it as to render the stud or screw ineffective as a means of attachment. The improved protecting devices which constitute the present invention involve a recognition of this fact and while still attaining the objects hereinbefore specified insure at least double the life to the protected sole or heel before it becomes necessary to have the boot re-soled or heeled.

The components of a boot protector according to this invention include a plurality of screws or studs with enlarged heads screwed into the permanent heel or sole of the boot, a plate or pad of india rubber or other suitable material having a plurality of slots or of pairs of holes in a recessed portion or portions of the same, and holding or clamping plate in such recessed portions of the pad having keyhole slots corresponding with the slots or pairs of holes in the pad, and the invention is distinguished from previously proposed devices by several features, one being that the pad and clamping plate elements, which are mutually separable from each other and from the fixing screws, are removable from the boot without withdrawing the screws and are moreover secured to each other and to the boot solely by means of the screws which coöperate with the keyhole slots of the clamping plate. Further the apertures in the pads and clamping plates are so related that reversal of the plate or the substitution of a counterplate, *e. g.* by an interchange of parts, enables the protector to be re-affixed in the same relative position on the boot but with the fixing screws in new positions. While the full benefit of the invention cannot be obtained by the user without the conjoint use of the separate elements it is to be understood that the separate elements, viz. the pads and plates constructed as hereinbefore described, are as much a part of this invention as the combination of these elements.

The various features of the invention will hereinafter be described in greater detail with reference to the accompanying drawings, wherein:—

Fig. 3 is a corresponding view of metal plate elements adapted for use with the pads of Figs. 1 and 2.

Fig. 3a is a similar view of a pair of counterplates which may for example be the plates associated with the corresponding pad on the fellow boot;

Fig. 4 is a diagrammatic plan view illustrating the method of removing the plates of Fig. 3, for the purpose of reversal of position of the pad, or of interchange, or renewal;

Fig. 5 is a clamping plate adapted for use with the pad of Fig. 6 and

Fig. 5a is the counterplate thereof;

Figs. 7 and 8 are alternative forms of metal plates to be used in conjunction with pads such as shown in Figs. 9 and 10, and Fig. 7a is the counter plate of Fig. 7.

Figs. 11 and 12 are modified constructions of clamping plates having asymmetrically disposed slots, adapted for use with a pad such as shown in Fig. 13, Fig. 12a being the counterplate of Fig. 12;

Fig. 14 shows a ring-shaped clamping plate, Fig. 14a being the counter plate and Figs. 15 and 16 detail views showing the clamping position of the plate and its removal position.

Fig. 17 is a plan of a disk-shaped clamping plate, Fig. 17ª being its counter plate.

Figs. 18 and 19 are plan views of disk pads adapted for use with the ring plates of Figs. 14 and 14ª.

Figs. 20 and 21 are plan views of disk pads adapted for use with the plates of Figs. 17 and 17ª.

Fig. 22 is a central section through a protector of disk pattern showing an undercut annular recess, and Fig. 23 is a section of an annular plug for same.

Fig. 24 shows four rectangular plates with longitudinal key-hole slots for use with pads of different sizes having rectangular recesses.

Fig. 25 is a plan view of the sole and heel of a boot fitted with protecting pads showing one of the preferred manners of subdividing the protected area, and Fig. 26 is a corresponding view showing an alternative method of subdivision of the protected area; both these figures illustrating also other arrangements or constructions of clamping plate not hereinbefore referred to.

It is to be understood that although the protecting pad is usually of india rubber, the term pad in this specification is to be regarded as including plates or pads of other material than india rubber, as for example leather, dermatine or iron, or any other material which may be applied usefully to the purposes in view.

Figure 1:
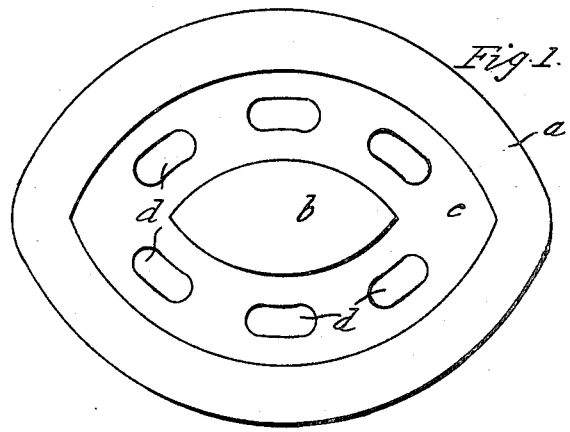
Figure 1 is an underside plan view of a rubber or other pad element designed particularly for the toe of a boot.

Referring first to Figs. 1—4, the pad shown in underside plan in Fig. 1 is more particularly adapted for application to the toes of boots, being so shaped that upon the toe part wearing out it can be reversed (that is to say turned *in situ* through an angle of 180°) so as to bring the comparatively unworn surface to the toe of the boot. The pad has an outer rim portion $a$ and flush therewith a central boss $b$, the two being separated by a recessed or grooved portion $c$ of considerably less thickness than the portions $a$, $b$. This recessed portion has a number of curved slots $d$ passing right through the material of the pad, or in lieu of these slots it may have a corresponding number of pairs of holes $d'$, as shown in the modified construction of Fig. 2.

The recess $c$ is adapted to receive a pair of plates in the form of ring segments $f$ which together just fill up the recess $c$, with the exception of a small portion at each end of the recess left vacant by the absence of two corners of the plates $f$ which are cut away as shown at $f$ in Figs. 3 to 4, for a reason which will presently appear.

The plates $f$ are provided with key-hole slots $g$ equal in number to the slots $d$ or pairs of holes $d'$ in the pad. The narrow ends of these key-hole slots are countersunk on the underside of the plate as shown at $h$, and when the pad and plates are in position on the boot they are secured by means of screws which are screwed home into the countersunk ends of the slots, through the slots or holes in the pad and into the leather of the boot.

When it is desired to reverse the position of the pad upon the toe of the boot, these screws are unscrewed sufficiently to enable the plate $f$ to be shifted as indicated in Fig. 4 so as to bring the heads of the screws in register with the enlarged ends of the key-hole slots $g$, an end of one plate sliding over the adjacent end of the other plate. It is for this reason that the tips of the plates $f$ are cut away at $f'$ as shown, as otherwise neither plate could be shifted as desired within the boundaries of the recess. This difficulty could also be overcome by making the recesses in the pad of sufficiently greater length than the plate, but this expedient is open to the objection that an appreciable part of the recessed portion of the pad would be left uncovered by the plate. The plates $f$ can thus be lifted clear of the screws and the pad sprung over the heads of the screws and reversed in position on the toe of the boot. The plates $f$ may then be re-applied by passing the enlarged ends of the key-hole slots over the heads of the screws and sliding the plates until the screw heads are over the narrow countersunk ends, whereupon the screws are again screwed home. When the pad is made of india-rubber it can be sprung over the heads of the affixing screws even although the slot or hole in the pad is little or no greater in width or diameter than the shank of the screw; when the pad is made of material not sufficiently elastic or flexible to permit this, the slots or holes in the pad are made of sufficient size to pass over the heads of the screws without any yielding of the material.

The pads may also be interchanged or may be renewed without change of plate. It is only when the screw holes become enlarged that the substitution of the counter-plate (Fig. 3ª) for the plate (Fig. 3) becomes necessary. In such a case the interchange of the clamping plates and consequential shifting of the positions of the screws gives an increased life to the soles or heels.

Figure 2:
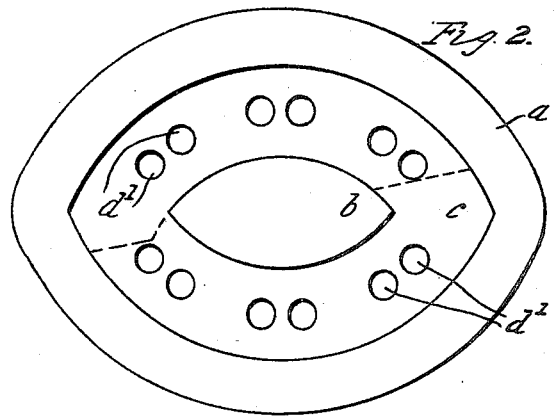
Fig. 2 is a similar view of a modified construction of the same.

In the case of the pad shown in Fig. 2, in which the recessed portion has a series of holes $d'$ arranged in pairs in lieu of slots $d$, the holes are spaced to enable the counter-plates to be applied or the pads to be interchanged.

When the pad has been worn in both positions on the same boot and it may become desirable to interchange, it is not necessary to remove the screws from either boot, but only to unscrew them partially, whereupon the plates and pads, being separately removable, may be interchanged. After such interchange each pad may again be reversed in position on the same boot and thus four times the amount of wear is obtainable in many cases from such a pad compared with the ordinary fixed pad.

These clamping plates and others subsequently described may be provided with pin holes $j$ to facilitate their removal and replacement.

In the modified construction of plates and pad shown in Figs. 5, 5ª and 6, the clamping plates for each pad may be in one piece or divided as indicated by the dotted lines. In this construction the slots in plates and pad are struck from a common center but with radii dependent on their distance therefrom so as to enable plate and pad to be rotated as a whole about this center, when the fixing screws are loosened, and the enlarged ends of the key-hole slots to be brought into register with the screw heads. For the same reason the lengths of the slots are made dependent on their distance from the common center.

The use of the plates and pads of Figs. 7–10 will be obvious from an inspection of the drawings. Plates and pads are moved as one for removal purposes after the screws are loosened. This movement is one of rotation in the case of the curved slot plates and the slots of the pad should, therefore, preferably be slightly curved as shown in Fig. 9. With the straight slotted plate of Fig. 8, which it may be noted requires no counter plate, the movement is purely translational and the slots in the pad may, therefore, be straight.

Figure 6:
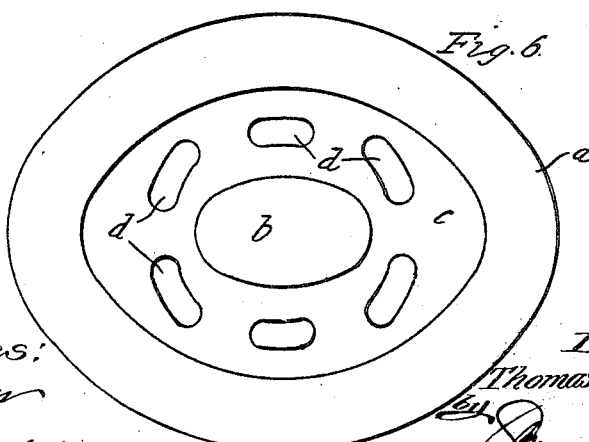

The plates of Figs. 11, 12 and 12ª differ from those of Figs. 5, 6 and 7 in this respect, namely that one of the key-hole slots $g$ is nearer the center of the plate than the other, instead of being symmetrically disposed. Consequently, the pad (Fig. 13) is made with a pair of slots for each key-hole slot of the plate, so as to enable the clamping plate to be used in the reversed position or a counter-plate substituted. The slots in the pad are straight or slightly curved according to the character of the movement required for their removal.

The plates shown in Figs. 14–17ª may be used in conjunction with disk pads suitable for the heels of boots or they may be applied also to the soles. As shown, both in the ring pattern and the disk pattern of plate, they have a plurality of curved key-hole slots $g$ struck from a common center.

In Fig. 15 the plate is shown in the clamping position when the screw head $i$ is screwed home into the countersunk narrow end of the key-hole slot $g$. In Fig. 16 the plate is shown turned to bring the head of the screw $i$ into register with the enlarged end of the key-hole slot for the purpose of removal or application.

The pad for use with the ring plates of Figs. 14, 14ª may, as shown in Fig. 19, have a series of curved slots $d$ in its recessed part, or an equivalent number of holes, or, as shown in Fig. 18, an equivalent number of pairs of holes.

The curves in the disk plates of Figs. 17, 17ª being quadrants, the pads used therewith are provided either with two quadrant slots (Fig. 21) or four quadrantally disposed holes (Fig. 20).

As shown in Fig. 22 the walls of the recess or recesses $c$ in the pad may be undercut for the reception and retention of a suitably shaped plug $C^0$ (Fig. 23) of india-rubber or other suitable material. It is essential that either the pad or the plug should be of resilient material, and further that the dimensions of the outer or tread surface of the plug should be somewhat greater than the dimensions of the mouth of the recess and the dimensions of the base of the plug substantially equal to those of the base of the recess. Under such conditions the stresses consequent on forcing the plug into the recess tends to force the edges of the pad against the leather of the sole or heel of the boot.

The plates shown in Fig. 24 may be used separately with correspondingly dimensioned pads, or they can be used in pairs or more placed end to end with pads of corresponding dimensions. The disposition of the key-hole slot in these plates is arranged so that when their positions are reversed whether used singly or plurally the screw hole will be formed in a part of the boot clear of the screw hole formerly in use.

The pads used in conjunction with these plates are usually formed with longitudinal slots in their recesses so that in order to remove the pad for the purpose of reversal or replacement, it is necessary merely to unscrew the retaining screws slightly and then shift pad and plate together until the screw heads register with the enlarged ends of the key-hole slots in the plates, when the plate can be removed and the pad passed or forced over the heads of the screws.

In this figure the key-hole slots in the several plates are shown as disposed in the same direction, but it will be obvious that when two or more of such plates are used in conjunction with one pad and the plates are juxtaposed as for example is shown in one of the two cross-bar pads in Fig. 26, with the key-hole slots so related that one of the plates can slide, after the screws are loosened, inward over the end of the adjacent plate, the plates (and the pad) can be removed without any lateral or longitudinal movement of the pad.

In Fig. 25 the larger disk pad has its edge cut away in four places so as to make the chamfered portion of the edge correspond more accurately with the contour of the edge of the boot at the place where the pad is applied, and similar excisions can be made in pads of other shapes for the like purpose. Furthermore, in this figure there is illustrated the modified construction of toe pad and its associated clamping plate shown in Figs. 5 and 6 in which the curved key-hole slots of the latter are all struck from the center of figure of the pad but each with an appropriate radius so that upon loosening the fixing screws and rotating pad and plate about the center to bring the enlarged end of the key-hole slots into register with the fixing screw heads, plate and pad may be removed separately or simultaneously without further disturbance of the screws. The same principle may obviously be applied to other pads of whatever shape, the only proviso being that there is sufficient clearance between adjacent pads on a boot to permit the required rotational movement.

The clamping plate of the toe protector in Fig. 25 may be slightly dished to fit the contour of the boot or it may be cut in two along the dotted lines with the same object. Other clamping plates may be similarly treated if necessary or desirable.

In all cases the walls of the recess in the pads may be undercut and these recesses may be filled by correspondingly shaped rings or plugs of india-rubber or any other suitable material, which are sprung into place within the recesses and by the pressure which they apply to the edges of the recesses they serve to urge the edges of the upper or inner surfaces of the pads, particularly when the latter are made of indiarubber, close to the leather sole or heel of the boot. To obtain such a result these plugs are preferably made taper or beveled and of width or diameter on their inner or upper surface equal to the corresponding dimension of the recess to which they are applied and of a slightly greater width or diameter on their outer or tread surface than the corresponding dimension of the recess.

To obtain the result contemplated it is not necessary that both plug and pad should be of indiarubber but either one or other must be of rubber or other resilient material.

When the pad is of indiarubber, a thin plate may be forced into the base of the recess to prevent access of dirt to the apertures in the clamping-plate and pad, and in the case of pads of whatever material having their recesses provided with rubber plugs, such plates are preferably interposed between the plugs and the clamping-plates to prevent adhesion of one to the other. These plates consists simply of thin disks or plates of metal or other suitable material of the same shape and plan as the rubber plugs and clamping plates between which they are interposed. One of these thin disks is shown in Fig. 22 and represented by s but it will be understood that similar plates of suitable shape may be used in connection with the other forms of my invention.

Having thus described the nature of the said invention and the best means I know of carrying the same into practical effect, I claim:—

1. A boot protector comprising pad and clamping elements separable from each other and having co-acting apertures therein, said elements being secured to the boot by a plurality of screws passing through said apertures, and the apertures in the clamping elements being in the form of key-hole shaped slots, substantially as described.

2. A boot protector comprising a pad element and a clamping plate separable therefrom, apertures in the pad and co-acting key-hole shaped slots in the clamping plate, said pad and plate being secured to the boot by a plurality of screws passing through said apertures and slots, which are so dimensioned and related as to enable pad and plate to be removed without withdrawal of the screws, substantially as described.

3. A boot protector comprising a pad element and a clamping plate separable therefrom, apertures in the pad and co-acting key-hole shaped slots in the clamping plate, said pad and plate being secured to the boot by a plurality of screws passing through said apertures and slots which are so dimensioned and related as to enable the plate to be moved relatively to the pad and both plate and pad removed from the boot without withdrawal of the screws, substantially as described.

4. A boot protector comprising a recessed pad element and a plurality of clamping plates accommodated in the recess of the pad and separable therefrom, apertures in the pad and co-acting apertures in the plates, said pad and plate being secured to the boot by a plurality of screws passing through said apertures which are so related and dimensioned as to enable the several plate elements to be moved relatively to each other within the recess without withdrawal of the screws, substantially as described.

5. A boot protector comprising separable pad and clamping plate elements, said pad being formed with a recessed portion pierced with a plurality of apertures and said clamping plate being accommodated in the pad recess and formed with a plurality of curved slots struck from a common center, and affixing screws passing through said apertures and slots and securing pad and plate to the boot, substantially as described.

6. A boot protector comprising a pad element and a clamping plate separable therefrom, said pad being provided with a plurality of apertures and said plate with co-acting curved key-hole shaped slots struck from a common center and of a length proportional to their distance from said center, and a plurality of screws securing said pad and plate to the boot, substantially as described.

7. A boot protector comprising a pad element having an undercut recess, a clamping plate element accommodated in said recess and a plug fitted in said recess over the clamping plate and having its tread surface of dimensions greater than the opening of the recess and its base substantially equal in dimensions to the base of the recess, substantially as described.

8. A boot protector comprising a pad having an undercut recess, a clamping plate in said recess, an india rubber plug fitted in said recess over the clamping plate, and a disk interposed between said plug and clamping plate, substantially as described.

In testimony whereof I have signed my name to this specification.

THOMAS RICHARD LULHAM.